G. W. WARNER.

RAIL JOINT.

APPLICATION FILED MAY 21, 1913.

Reissued Nov. 4, 1913.

13,639.

2 SHEETS—SHEET 1.

Witnesses

J. M. Fowler Jr.

Grace B. Humphrey

Inventor

Gilbert W. Warner

By

C. E. Humphrey

Attorney

COLUMBIA PLANOGRAPH CO., WASHINGTON, D. C.

G. W. WARNER.

RAIL JOINT.

APPLICATION FILED MAY 21, 1913.

Reissued Nov. 4, 1913. 13,639.

2 SHEETS—SHEET 2.

Witnesses

J. M. Fowler Jr.

Grace B. Humphrey

Inventor

Gilbert W. Warner

By C. E. Humphrey

Attorney

UNITED STATES PATENT OFFICE.

GILBERT W. WARNER, OF KENMORE, OHIO.

RAIL-JOINT.

13,639. Specification of Reissued Letters Patent. Reissued Nov. 4, 1913.

Original No. 1,035,282, dated August 13, 1912, Serial No. 697,328. Application for reissue filed May 21, 1913. Serial No. 769,123.

*To all whom it may concern:*

Be it known that I, GILBERT W. WARNER, a resident of the village of Kenmore, in the county of Summit and State of Ohio, have invented certain new and useful Improvements in Rail-Joints, of which the following is a specification.

This invention relates to rail joints, and the object thereof is the provision of means for connecting the contiguous or abutting ends of railroad rails.

Another object of this invention is to provide means embodying a novel rail-chair for use in forming the rail joint, the function of said rail-chair being to assist in uniting the ends of contiguous rails so as to obviate the jarring and bumping when rolling stock passes over such a joint.

A further object of this invention is to provide a rail joint that has novel fastening and locking means which is protected from the elements and against tampering by unauthorized persons.

A still further object of this invention is to accomplish the above results by certain instrumentalities that are cheap, durable, easily installed, and highly efficient for the purposes for which they are intended.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 1:
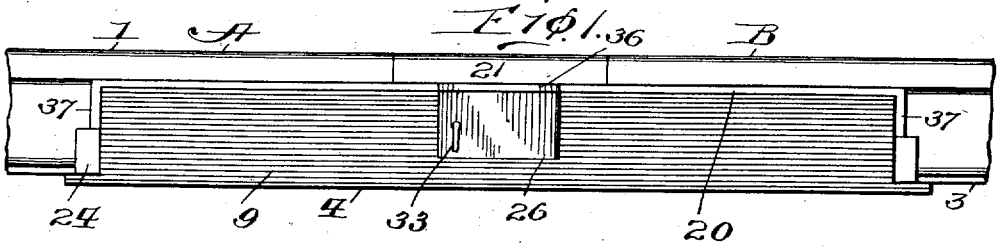
Figure 2:
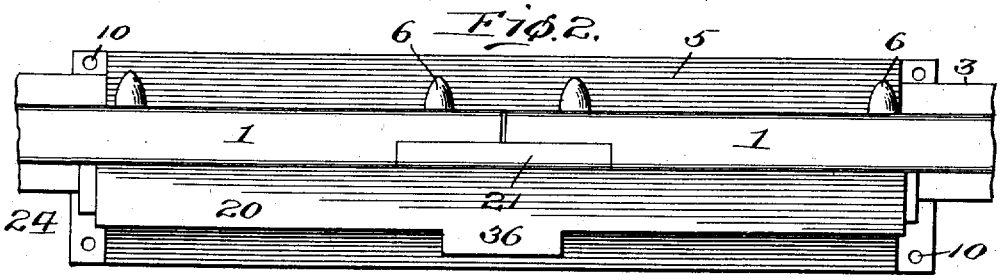
Figure 3:
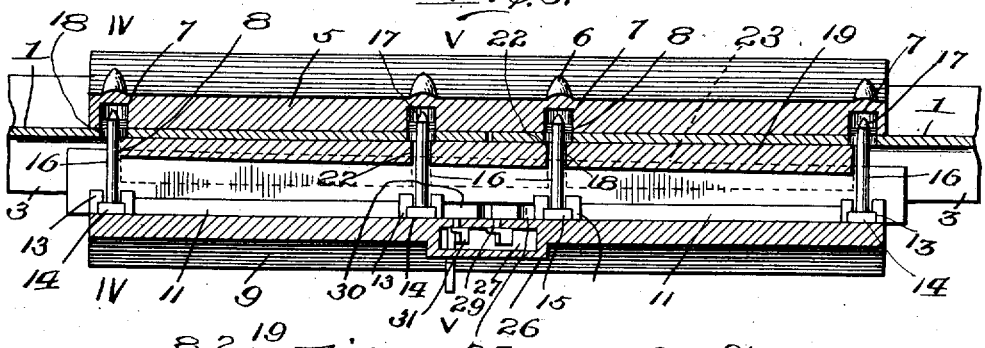
Figure 4:
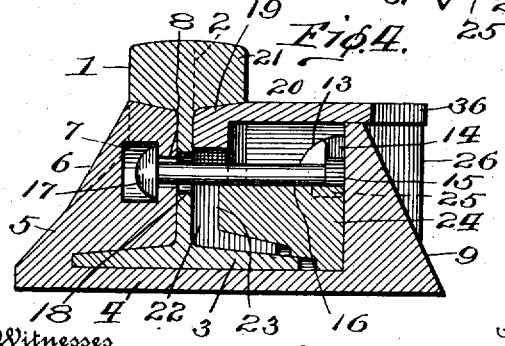
Figure 5:
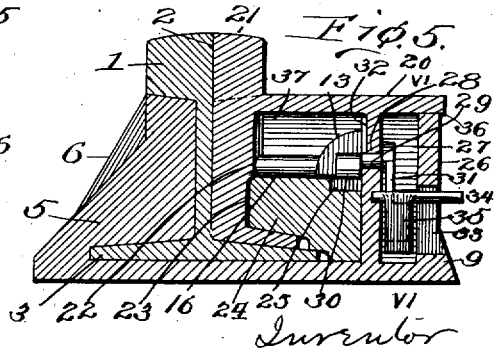
Figure 6:
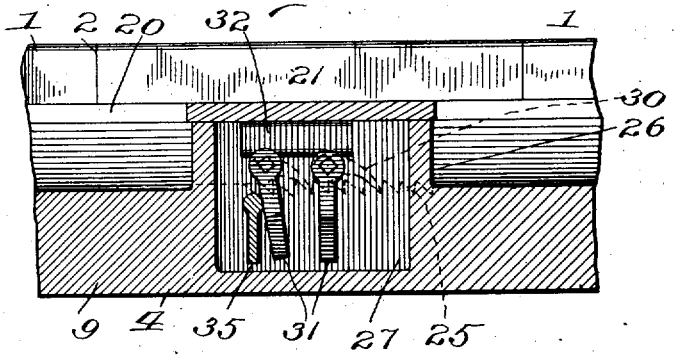
Figure 7:
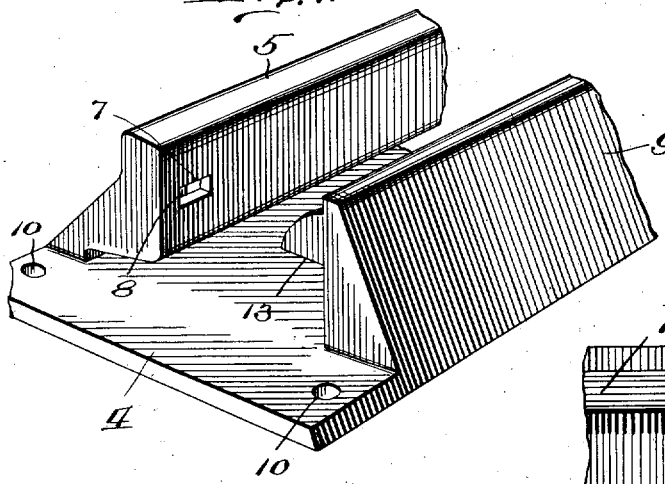
Figure 8:
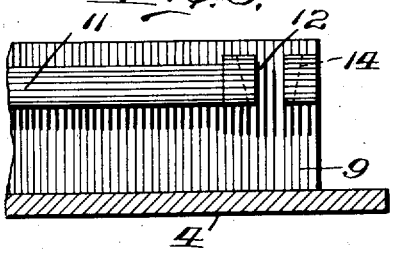
Figure 9:
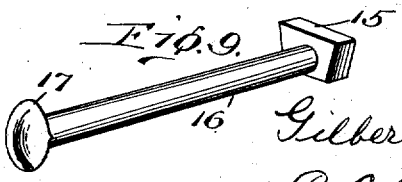

In the drawings in which similar reference numerals indicate like parts in the different figures, Figure 1, is a view in side elevation of a rail joint embodying this invention; Fig. 2, is a plan of the device shown in Fig. 1; Fig. 3, is a horizontal sectional view of the rail joint forming my invention; Fig. 4, is a cross sectional view on line IV—IV of Fig. 3; Fig. 5, is a similar view taken on line V—V of Fig. 3; Fig. 6, is a longitudinal sectional view on line VI—VI of Fig. 5; Fig. 7, is a perspective view of a portion of the rail chair employed; Fig. 8, is a longitudinal sectional view of a portion of the rail chair; and, Fig. 9, is a perspective view of a bolt used in forming the rail joint.

Referring to the drawings in detail, the reference characters A and B generally denote the abutting or contiguous ends of two railroad rails, each of which embodies a head 1, a base flange 3, and a vertical or upwardly-extending web. The heads of the rails on one side are cut away at their ends so that when two rails are juxtapositioned a recess 2 is formed. The webs of the rails are also provided with the ordinary transverse bolt holes 18.

In uniting the ends of the rails A and B together I employ a rail chair 4 consisting of a base on which the base flanges 3 of the rails are seated and which is provided along its side faces with upwardly-extending walls, the wall on one side being denominated as a splice bar and referred to by the reference numeral 5, and it is arranged to engage the side-faces of the ends of the rails. This fixed splice bar 5 is provided on its outer face with a plurality of projections 6 within each of which is a pocket 7 from which extends a communicating slot 8. Spaced from the splice bar 5 and extending in parallelism therewith is a wall 9 of the rail-chair, preferably in the form of the frustum of a pyramid in transverse cross section and provided on its inner face, by which is meant the one which opposes the wall 5, with a longitudinally-extending rib 11. The rib 11 at points opposite to the slots 8 is provided with slots 12 and on opposite sides of each slot 12 are lugs 13. The opposing faces of these lugs are downwardly inclined toward each other to form V-shaped recesses the sides of which provide seats 14. The recesses in the rib 11 and the slots 8 in the member 5 are placed in transverse alinement with the bolt openings 18. In order to secure the members 5 and 9 together and stiffen them against lateral movement I employ a plurality of bolts 16, shown best in Fig. 9, each embodying a head 17 at one end and a head 15 at the opposite end, the latter being trapezoidally formed.

In assembling the elements heretofore enumerated the ends of the rails are positioned end to end upon the base of the rail-chair 4 with the openings 18 in alinement with the slots 8 and the recesses in the member 9, and the bolts 16 are positioned by inserting their heads 17 through the slots and by giving the bolts a one-quarter rotation the side faces of the wedge-shaped heads 15 are forced into engagement with the seats 14 and when so arranged the tendency due to jarring and vibration is to gradually tighten their engagement with the parts with which they coöperate. The ends of the base of the rail chair 4 are extended beyond the ends of the walls 5 and 9 and in these extended portions are provided openings 10 through which may be placed spikes for securing the rail chair to the sleepers on which they are mounted. The outer face of the wall 9 of the rail chair is provided with a projection 26 containing a chamber or recess 27 and this recess is spaced from the opening in the rail chair which receives the ends of the rails by a wall in which are a plurality of slots 28.

From the foregoing description it will be apparent that the rail chair is essentially a trough-shaped member provided with upwardly-extending parallel walls 5 and 9 which are united by detachably positioned bolts 16, used for uniting them together for stiffening the entire structure against lateral movement.

The space intervening between the wall 9 and the sides of the rail ends is filled by a fixed member and a shiftable member, the fixed member embodying a detachable splice bar 19 which consists of an upper wall 20 arranged to rest on the upper face of the wall 9 and extend laterally therefrom to and into engagement with the side faces of the ends of the rails A and B. The upper wall 20 is provided intermediate its sides with a depending keeper 32 which is arranged in vertical registration with the inner wall of the chamber or recess 27. The inner portion of the splice bar 19, by which is meant that portion thereof which engages the side faces of the rails A and B, is provided with vertical slots 22 arranged in transverse registration with the slots 8 in the member 5 and the slots formed between the lugs 13. The detachable splice bar 19 is provided on that face nearest the upright wall 9 of the rail chair with a longitudinally-extending wedge-shaped groove 23 in which is arranged a longitudinal tapering wedge 24 arranged when shifted longitudinally to engage the vertical wall of the groove 23 and also the inner side face of the wall 9 of the rail chair for forcing the splice bar 19 laterally against the side faces of the ends of the contiguous rails A and B, and forms the shiftable member of the device used for connecting the ends of contiguous rails. The wedge 24 has ratchet teeth 25 formed in its upper face.

Mounted in the slots 28 in the wall which exists between the recess 27 and the open central portion of the rail chair are transverse pins 29 bearing pawls 30 on their inner ends adapted to engage the ratchet teeth 25 on the wedge 24. The outer ends of the pins 29 are provided with depending crank arms 31. It will be noted that the keeper 32 depending from the closure portion 20 of the splice bar 19 serves to convert the slots 28 into bearings for these pins. In the outer wall of the projection 26 and preferably at one end thereof is an opening 33 through which may be inserted a key 34 and which when the blade 35 thereof is rotated engages one of the crank arms 31 which in turn engages the other crank arm during its rocking movement to thereby shift the pawls 30 out of engagement with the ratchet teeth. When the crank arms 31 are not shifted by the key their weight tends to maintain the pawls 30 in engagement with the ratchet teeth 25 and prevent any longitudinal shifting movement thereof, but when the crank arms are rocked through the medium of the key to raise the pawls 30 from engagement with the ratchet teeth 25, the wedge may be withdrawn from its seat in the groove 23 thereby enabling the splice bar to be removed, after which the bolts 16 are easily removed and the ends of the rails can then be separated.

In carrying out this invention I preferably provide the ends of the splice bar 19 with closure walls 37 for preventing the entrance of dirt and other foreign substances into the mechanism of the device.

It will be noted that by forcing the wedge-shaped member 24 to the right in Figs. 1 and 2, a wedging action is set up, tending to force the side or inner face of the splice bar 19 against the webs, flanges and heads of the rails which thereby holds them against movement and as the projection 21 fills the recess 2 a continuous uninterrupted tread for rolling stock will be provided. It will be noted further that as the bolts 16 are considerably less in diameter than the openings 18 the rails are permitted to move due to the forces of contraction and expansion without disassembling the joint.

I claim:—

1. In a rail joint, the combination with rails having the heads thereof at the confronting ends of said rails cut away, of a rail chair supporting the confronting ends of said rails, a splice bar formed integral with said chair and bracing the inner edges of said rails, said splice bar having pockets formed therein, a brace carried by the outer edge of said chair, a longitudinal rib carried by the inner side of said brace and provided with seats, bolts having the ends thereof arranged in the seats of said brace and in the pockets of said splice bar and extending through the webs of said rails, a slotted detachable splice bar engaging the outer sides of said rails, a projection mounted in said cut away ends of the rails, a wedge interposed between said detachable splice bar and said brace, and a locking mechanism arranged within said brace and engaging said wedge for retaining said wedge between said splice bar and said brace.

2. In a rail joint, the combination with rails having the heads thereof cut away at the confronting ends of said rails, of a chair adapted to support said rails, a splice bar formed integral therewith and bracing the inner sides of said rails, said splice bar having pockets formed therein, a longitudinal brace carried by the outer edge of said chair and having the inner side thereof provided with seats, bolts extending through said rails and having the ends thereof arranged in the pockets of said splice bar and in the seats of said brace, a slotted detachable splice bar engaging the outer sides of said rails, a projection carried by said detachable splice bar and extending into the cut away portions of the heads of said rails, a tapering wedge arranged between said detachable splice bar and said brace, a locking mechanism carried by said brace for locking said wedge in position, and a closure plate carried by said detachable splice bar and extending over said brace.

3. In a rail joint, the combination with rails having the heads thereof at the confronting ends cut away, of a chair supporting said rails, a splice bar formed integral with said chair, a brace carried by the outer edge of said chair, bolts extending through said rails and having the ends thereof held by said splice bar and said brace, a detachable splice bar arranged between said brace and the outer sides of said rails, a projection carried by said splice bar and extending into the cut away portions of the heads of said rails, a wedge arranged between said splice bar and said brace, a key actuated locking mechanism associated with said brace and adapted to lock said wedge between said brace and said detachable splice bar, and a closure plate carried by said detachable splice bar and extending over said brace and closing the space between said brace and said detachable splice bar.

4. In a rail joint, the combination with the abutting ends of railroad rails, of a rail chair embodying a trough-shaped member with two upwardly projecting side walls formed integral therewith, one of said side walls engaging one side of said rails and provided with pockets, the opposite side wall of said chair spaced from the rail and provided on its inner face with seats, having vertically-inclined side walls, stiffening double-headed bolts extending through suitable apertures in the webs of said rails and provided with heads at one end to engage in said pockets and having wedge-shaped heads at the opposite end to engage the vertically-inclined walls of said seats, a movable splice bar positioned between said spaced wall and the sides of said rails and provided with a longitudinally-extending wedge-shaped opening, a wedge engaging the wall of said chair and positioned in said opening and arranged when shifted to force said detachable splice bar against said rails, and locking means engaging said wedge for retaining it against movement.

5. In a rail joint, the combination with the abutting ends of railroad rails having the heads thereof cut away to form a lateral recess, of a rail chair comprising a trough-shaped member provided with a pair of upwardly-extending walls one of which is arranged to engage the side faces of the ends of said rails and constitute a splice bar, said wall further provided with pockets, the opposite wall of said bar spaced from said rails, removable bolts extending between said walls through the webs of said rails for stiffening the chair, a movable splice bar positioned between one of the walls of said chair and the sides of said rails, said splice bar provided with a longitudinally-extending wedge-shaped opening, and further provided with an upwardly-extending projection arranged to fill said recess, a longitudinally-shiftable wedge mounted in the opening in said splice bar and engaging one of the walls of said chair, and means for locking said wedge against movement.

6. In a rail joint, the combination with the abutting ends of railroad rails, of a chair comprising a trough-shaped structure with two upwardly-extending walls one of which is adapted to engage the lateral faces of said rails and constitute a fixed spliced bar, having T-shaped recesses, the side walls of which are vertically-inclined to form seats, double-headed bolts extending from the fixed spaced bar through suitable apertures in the webs of the rails and with the heads at one end of the bolts wedge-shaped to engage said seats for stiffening said rail chair, a movable splice bar interposed between the spaced wall of said chair and the sides of said rails and provided with means to receive a longitudinally-shiftable wedge, and a wedge mounted for longitudinally-shifting and engaging said wall for forcing said movable splice bar against the sides of said rails.

7. In a rail joint, the combination with the abutting ends of railroad rails, of a rail chair comprising a trough-shaped structure having two upwardly-extending walls one of which is adapted to engage the lateral face of said rails and constitute a fixed splice bar, the other wall spaced from said rails, one of said walls provided with pockets and the other wall with T-shaped recesses constituting seats, the seats being in transverse alinement with the pockets, the openings communicating with said pockets being elongated, a plurality of double-headed bolts the end of each of which is provided with an elongated head to pass through said openings into said pockets and interlock behind the walls thereof, the opposite end of each of said bolts being wedge-shaped to effect a wedging action when placed in said seats, a movable splice bar interposed between said spaced wall and the sides of said rails and engaging the latter and provided with a longitudinally-extending opening, and a longitudinally-shiftable wedge engaging said spaced wall and movable splice bar for forcing the latter against the sides of said rails for holding them against lateral movement, and means for locking said wedge against shifting.

8. In a rail joint, the combination with the abutting ends of railroad rails, having the heads thereof cut away to form a recess when abutted, of a rail chair comprising a trough-shaped structure having two upwardly-extending walls one of which is adapted to engage the sides of said rails and forming a fixed splice bar, the other wall spaced from said rails, said spaced wall provided with a chamber formed therein, a movable splice bar interposed between said spaced wall and the sides of said rails and engaging the latter, said splice bar provided with a projection to fill said recess, said splice bar arranged to extend over the space between said spaced wall and said rails for constituting a closure device therefor, said movable splice bar provided with a longitudinally-extending opening, a longitudinally-shiftable wedge in said opening arranged when shifted to force said splice bar against said rails for holding them against lateral movement and a locking device arranged in said chamber and engaging said wedge for holding the latter against longitudinal shifting.

In testimony whereof I have hereunto set my hand in the presence of two subscribing witnesses.

GILBERT W. WARNER.

Witnesses:
A. L. McClintock,
C. E. Humphrey.

Copies of this patent may be obtained for five cents each, by addressing the "Commissioner of Patents, Washington, D. C."